United States Patent
Kusabuka

(10) Patent No.: US 12,073,035 B2
(45) Date of Patent: Aug. 27, 2024

(54) DISPLAYED INFORMATION CONTROL APPARATUS, DISPLAYED INFORMATION CONTROL METHOD, AND PROGRAM

(71) Applicant: NIPPON TELEGRAPH AND TELEPHONE CORPORATION, Tokyo (JP)

(72) Inventor: Takahiro Kusabuka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/922,422

(22) PCT Filed: May 18, 2020

(86) PCT No.: PCT/JP2020/019661
§ 371 (c)(1),
(2) Date: Oct. 31, 2022

(87) PCT Pub. No.: WO2021/234785
PCT Pub. Date: Nov. 25, 2021

(65) Prior Publication Data
US 2023/0205331 A1 Jun. 29, 2023

(51) Int. Cl.
*G06F 17/00* (2019.01)
*G06F 3/01* (2006.01)
(Continued)

(52) U.S. Cl.
CPC ............ *G06F 3/038* (2013.01); *G06F 3/011* (2013.01); *G06F 16/9027* (2019.01); *G06F 3/04815* (2013.01)

(58) Field of Classification Search
CPC ...... G06F 3/038; G06F 3/011; G06F 16/9027; G06F 3/04815; G06F 3/0481;
(Continued)

(56) References Cited

U.S. PATENT DOCUMENTS 8,209,635 B2 * 6/2012 Thom .................. G06F 1/1686
715/788
8,515,491 B2 * 8/2013 Das .................. H04M 1/72481
455/566

(Continued)

FOREIGN PATENT DOCUMENTS

| JP | 200890552 A | 4/2008 |
| JP | 20138193 A | 1/2013 |
| JP | 2017103638 A | 6/2017 |

OTHER PUBLICATIONS

Li, Andol X., et al. "Improving the user engagement in large display using distance-driven adaptive interface." Interacting with computers 28.4 (2016): 462-478 (Year: 2016).*

(Continued)

*Primary Examiner* — Andrew T McIntosh
(74) *Attorney, Agent, or Firm* — Harness, Dickey & Pierce, P.L.C.

(57) ABSTRACT

Information having a hierarchical structure is appropriately selected and displayed in accordance with a change in a user. Provided are: a display unit; a storage unit configured to store information to be displayed on the display unit, the information having a plurality of hierarchical structures; and a display control unit configured to read information from the storage unit while selecting a level and display the read information on the display unit, based on a maximum viewing distance between the display unit and a viewer viewing the display unit at which the viewer is able to view the display unit while holding a device housing, and on a current viewing distance between the viewer and the device housing.

7 Claims, 8 Drawing Sheets

| root CONTENT ID | 1 | 2 | ... |
|---|---|---|---|
| OVERALL NUMBER OF LEVELS | 2 | 1 | ... |
| THRESHOLD FOR LEVEL 2 | 400 | null | ... |
| ... | ... | ... | ... |

(51) Int. Cl.
*G06F 3/038* (2013.01)
*G06F 16/901* (2019.01)
*G06F 3/04815* (2022.01)

(58) Field of Classification Search
CPC .... G06F 3/0484; G06F 3/0485; G06F 3/0487; G06F 1/1686; G06F 1/1694; G06F 3/013; G06F 3/0482; G06F 3/04847; G06F 3/04845
See application file for complete search history.

(56) References Cited

U.S. PATENT DOCUMENTS

| | | | |
|---|---|---|---|
| 8,984,445 B1* | 3/2015 | Bailiang | G06F 16/9537 701/445 |
| 11,009,962 B2* | 5/2021 | Thapliyal | G04G 9/0064 |
| 2009/0079765 A1* | 3/2009 | Hoover | G06F 3/0481 345/173 |
| 2013/0033485 A1* | 2/2013 | Kollin | G06F 3/0484 345/660 |
| 2015/0242993 A1* | 8/2015 | Raman | G06F 3/017 345/589 |
| 2020/0249476 A1* | 8/2020 | Wu | G02B 7/08 |

OTHER PUBLICATIONS

Andrews, Christopher, et al. "Information visualization on large, high-resolution displays: Issues, challenges, and opportunities." Information Visualization 10.4 (2011): 341-355 (Year: 2011).*

* cited by examiner

Fig. 2C

| ID | 1 | 2 | 3 | ... |
|---|---|---|---|---|
| Content | IMAGE_01.jpg | IMAGE_02.jpg | Application B | ... |
| Parent ID | null | null | 1 | ... |

Fig. 2D

| root CONTENT ID | 1 | 2 | ... |
|---|---|---|---|
| OVERALL NUMBER OF LEVELS | 2 | 1 | ... |
| THRESHOLD FOR LEVEL 2 | 400 | null | ... |
| ... | ... | ... | ... |

13

DISPLAYED INFORMATION CONTROL APPARATUS, DISPLAYED INFORMATION CONTROL METHOD, AND PROGRAM

CROSS-REFERENCE TO RELATED APPLICATIONS

This application is a 371 U.S. National Phase of International Application No. PCT/JP2020/019661, filed on May 18, 2020. The entire disclosures of the above applications are incorporated herein by reference.

TECHNICAL FIELD

The present invention relates to a display information control device, a display information control method, and a program.

BACKGROUND ART

A technique has been proposed in which, in order to enable estimation of an area on a display unit that is being observed by a user even if the distance between the user and the display unit changes, options are narrowed down based on image recognition and a change in the orientation of the terminal by estimating the user's angle of view from the shooting angle of view (PTL 1).

CITATION LIST

Patent Literature

[PTL 1] Japanese Patent Application Publication No. 2017-103638

SUMMARY OF THE INVENTION

Technical Problem

The technique described in PTL 1 makes it possible to select one from a plurality of candidates displayed as contents based on a change in the terminal orientation. Meanwhile, if a plurality of hierarchical structures are associated with one candidate, the candidate cannot be selected in the depth direction of the hierarchy.

The present invention has been made in view of the foregoing circumstances, and an object of the invention is to provide a display information control device, a display information control method, and a program that make it possible to appropriately select and display information having a hierarchical structure in accordance with a change of a user who views a display unit.

Means for Solving the Problem

One aspect of the present invention includes: a display unit; a storage unit configured to store information to be displayed on the display unit, the information having a plurality of hierarchical structures; and a display control unit configured to read information from the storage unit while selecting a level and display the read information on the display unit, based on a maximum viewing distance between the display unit and a viewer viewing the display unit at which the viewer is able to view the display unit while holding a device housing, and on a current viewing distance between the viewer and the device housing.

Effects of the Invention

According to one aspect of the present invention, it is possible to appropriately select and display information having a hierarchical structure in accordance with a change of a user who views a display unit.

BRIEF DESCRIPTION OF DRAWINGS

FIG. 2C shows an example of the content of a content DB according to the same embodiment.

FIG. 2D shows an example of the content of a number-of-levels/level switching threshold DB according to the same embodiment.

DESCRIPTION OF EMBODIMENTS

The following is a description of one embodiment in the case of installing and implementing functions of a display information control device of the present invention as an application program on a mobile information terminal such as a smartphone.

Configuration

Figure 1:
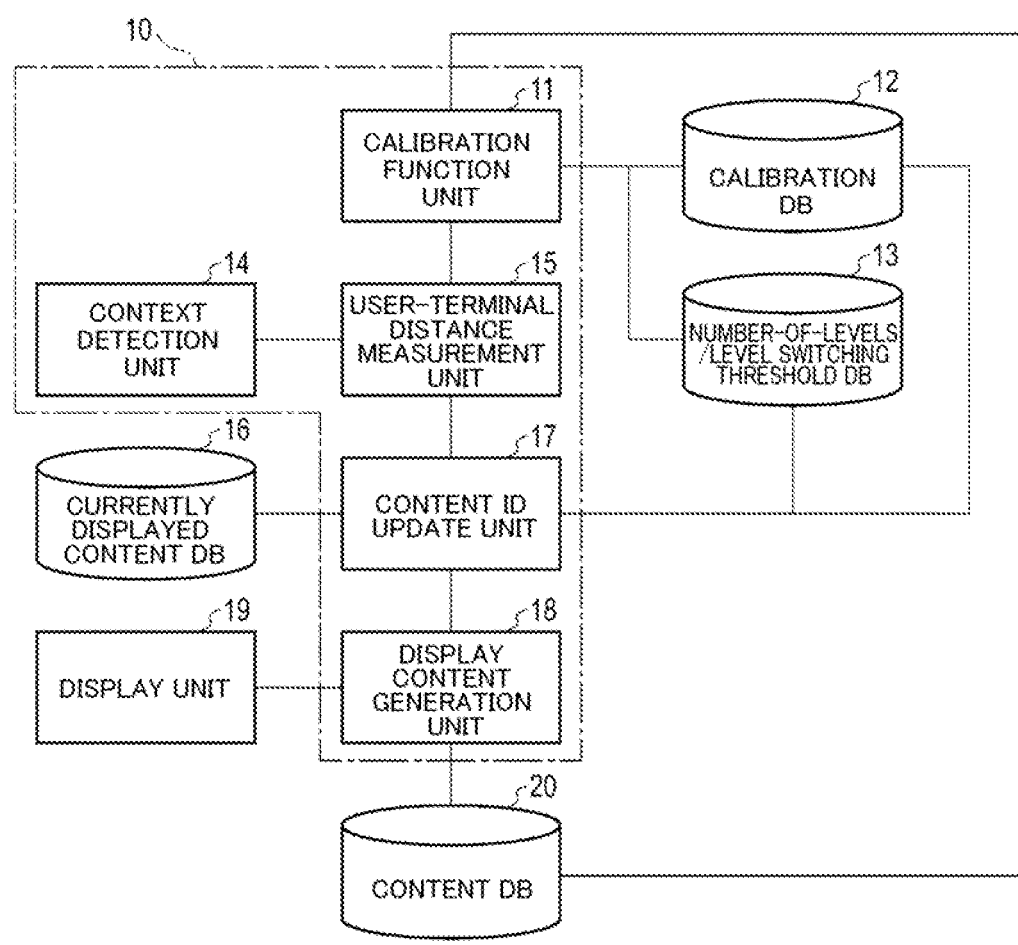
FIG. 1 is a block diagram showing a functional configuration of a display information control device according to one embodiment of the present invention.

A functional configuration of a display information control device according to the present embodiment will be described with reference to FIG. 1. As shown in FIG. 1, the display information control device includes a calibration function unit 11, a calibration database (hereinafter referred to as "DB") 12, a number-of-levels/level switching threshold DB 13, a context detection unit 14, a user-terminal distance measurement unit 15, a currently displayed content DB 16, a content ID update unit 17, a display content generation unit 18, a display unit 19, and a content DB 20.

The calibration function unit 11, which is a function unit for performing later-described calibration processing, measures a maximum movement distance, stores data in the calibration DB 12, calculates the overall number of levels and a level switching threshold for each root content ID based on the content DB 20 and the content stored in the content DB 20, and stores the calculation results in the number-of-levels/level switching threshold DB 13.

Figure 2A:
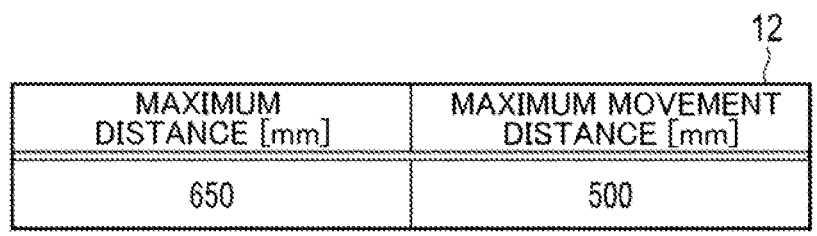
FIG. 2A shows an example of the content of a calibration DB according to the same embodiment.

FIG. 2A shows an example of the content stored in the calibration DB 12. As shown in FIG. 2A, the calibration DB 12 stores a maximum distance and a maximum movement distance.

The maximum distance refers to a maximum viewing distance when a viewer (hereinafter referred to as "user") uses a mobile information terminal such as a smartphone in which this display information control device is implemented, that is, the distance between the user's eye position and the mobile information terminal held by the user stretching his stretching to the maximum extent possible within the range of his natural state. The maximum distance is fixed by a prior calibration process.

The maximum movement distance is a difference ($d_{max}-d_{min}$ [mm]) obtained by subtracting the distance (drain [mm]) between the mobile information terminal and the user's eye position from the maximum distance ($d_{max}$ [mm]), the difference being measured every time the application program serving as the display information control device starts.

FIG. 2D shows an example of the content stored in the number-of-levels/level switching threshold DB 13. The number-of-levels/level switching threshold DB 13 stores, for each root content ID, the overall number of levels and a threshold that serves as a reference for switching the level.

The context detection unit 14 detects, using face recognition technology or the like, an image of the user of the mobile information terminal while separating the image from the background in an image shot by an image capture unit arranged on the same surface as a display (display unit 19) of the mobile information terminal, and outputs the detection results to the user-terminal distance measurement unit 15.

The context detection unit 14 also extracts objects such as buildings and signboards in a forward view that the user is considered to be looking at as subjects from an image shot by another image capture unit arranged on a surface opposing the display (display unit 19) of the mobile information terminal, and detects corresponding position information together.

Detection of position information will be described. Position information (latitude, longitude, altitude) in a 3D space corresponding to each subject appearing in the shot image may be detected by referencing the image of the view in front of the user obtained by the other image sensor arranged on the surface opposing the surface where the display unit 19 of the mobile information terminal is arranged, the focusing distance of each point position in the image, the shooting angle of view of this image capture unit, the current position information based on a GPS (Global Positioning System) receiving function provided in the mobile information terminal, the current azimuth at which a magnetic sensor that is also provided in the mobile information terminal is facing, the current elevation/depression angle in the facing direction of an acceleration sensor that is also provided in the terminal, and so on.

The user-terminal distance measurement unit 15 measures the distance between the user and the terminal based on the focusing distance at an eye position in the image of the user of this mobile information terminal, specifically an image of the user's face obtained by means of face recognition technology, excluding the background part of the image detected by the context detection unit 14. The measurement of the distance between the user and the terminal by the user-terminal distance measurement unit 15 is continued at any time during execution of the application program serving as the display information control device.

Figure 2B:
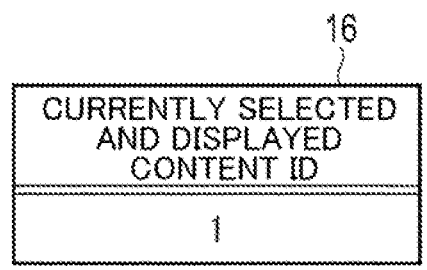
FIG. 2B shows an example of the content of a currently displayed content DB according to the same embodiment.

FIG. 2B shows an example of the content stored in the currently displayed content DB 16. The currently displayed content DB 16 stores a content ID of a currently displayed content.

The content ID update unit 17 is a function unit that updates the currently selected content ID, as necessary, based on the current content ID stored by the currently displayed content DB 16, the maximum distance and the maximum movement distance stored in the calibration DB 12, and the current distance between the user and the terminal measured by the user-terminal distance measurement unit 15. The content ID update unit 17 rewrites the content stored in the currently displayed content DB 16 as appropriate.

The display content generation unit 18 generates a content to be displayed on the display unit 19 based on the results of updating by the content ID update unit 17, contents stored in the content DB 20, and the content stored in the number-of-levels/level switching threshold DB 13.

The display unit 19 is a display of the mobile information terminal. The display unit 19 displays a content based on augmented reality (AR) technology by displaying an image of the content generated by the display content generation unit 18 while superimposing this image on the image obtained by the image capture unit arranged on the surface of a housing of the mobile information terminal that opposes the surface where the display unit 19 is arranged, during execution of the application program serving as the display information control device.

FIG. 2C shows an example of the content stored in the content DB 20. The content DB 20 stores content files to be displayed on the display unit 19 and their parent IDs. For example, contents with content IDs 1 and 2 are both image data of JPEG (Joint Photographic Experts Group) files, and are both root contents without a higher parent ID.

A content with a content ID 3 is an application program that has the content with the soft content ID 1 as a parent, and the content IDs 1 and 3 have a hierarchical structure.

It is possible to have a plurality of lower-level contents for a single root content. As a result, the content DB 20 stores contents having a plurality of tree-like hierarchical structures together with information indicating these hierarchical structures.

The aforementioned calibration function unit 11, context detection unit 14, user-terminal distance measurement unit 15, content ID update unit 17, and display content generation unit 18 constitute the display content generation unit 10 of the present embodiment.

[Operation]

First, a description will be given of a first calibration operation as a preliminary setup to store the user-specific maximum distance when a mobile information terminal is used as the display information control device.

Figure 3:
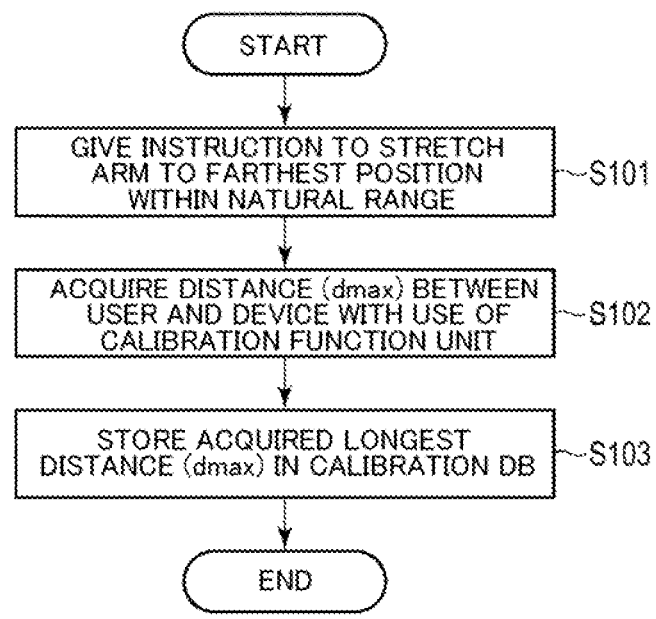
FIG. 3 is a flowchart showing processing content of a first calibration operation according to the same embodiment.

FIG. 3 is a flowchart showing processing content of the first calibration operation. During the first calibration operation, the display content generation unit 18 first displays, on the display unit 19, an instruction that the user is to stretch his arm to the farthest position within a natural range, using guide message data stored in the content DB 20 (step S101).

The maximum distance ($d_{max}$) between the user and the terminal is measured by the user-terminal distance measurement unit 15 based on an image including the user that is obtained, in this state, by the image capture unit arranged on the same surface as the display unit 19 of the information mobile terminal functioning as the display information control device, and on focusing distance information regarding each part of the image. The calibration function unit 11 acquires the measurement results (step S102).

The calibration function unit 11 stores the acquired maximum distance ($d_{max}$) between the user and the terminal in the calibration DB 12 as shown in FIG. 2(A) (step S103), and ends the first calibration processing.

Next, a description will be given of a second calibration display operation during execution of the application program that uses the mobile information terminal as the display information control device.

Figure 4:
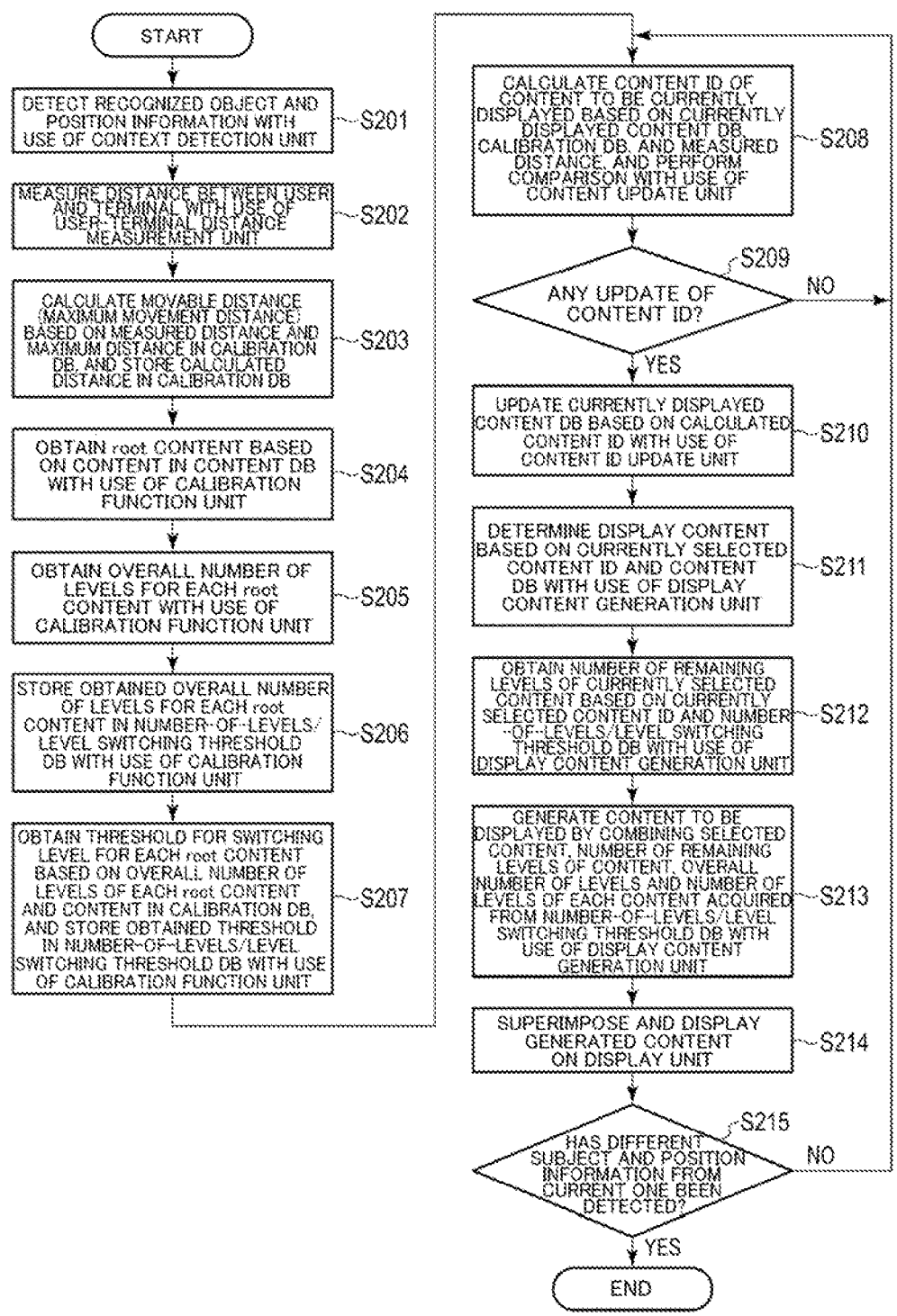
FIG. 4 is a flowchart showing processing content of a second calibration and display operation according to the same embodiment.

FIG. 4 is a flowchart showing processing content of the second calibration and display operation. First, the context detection unit 14 detects objects including the user that appear in an image and their position information based on the image including the user that is obtained by the image capture unit arranged on the same surface as the display unit 19 of the information mobile terminal and focusing distance information regarding each part in the image (Step S201).

The user-terminal distance measurement unit 15 measures a reference distance ($d_{min}$) between the user and the mobile information terminal based on the results detected by the context detection unit 14 (Step S202).

The user-terminal distance measurement unit 15 performs subtraction "$d_{max}-d_{min}$" using the maximum distance ($d_{max}$) stored in the calibration DB 12 and the distance (d obtained by the current measurement, and stores the obtained difference as a movable distance (maximum movement distance) in the calibration DB12 (step S203).

The calibration function unit 11 obtains a root content whose parent ID is "null" based on the data contents stored in the content DB 20 (step S204).

Note that in order to obtain the root content from the contents DB 20, a root content that is considered to correspond to an object to serve as a subject in a shot image is selected by referencing: an image of a forward view that the user is considered to be looking at that is obtained by the other image capture unit provided on the surface opposing the display unit 19 of the mobile information terminal and the focusing distance of each point position in the image; the shooting angle of view of this image capture unit; current position information based on the GPS function provided in the mobile information terminal; the current azimuth at which the magnetic sensor that is also provided in the mobile information terminal is facing; the current elevation/depression angle in the facing direction of the acceleration sensor that is also provided in the terminal, and so on.

The calibration function unit 11 obtains, for each root content obtained, the overall number of levels of the corresponding content stored in the content DB 20 (step S205).

The calibration function unit 11 stores the obtained overall number of levels for each root content in the number-of-levels/level switching threshold DB 13 (step S206).

Further, the calibration function unit 11 obtains a threshold for switching the level for each root content based on the obtained overall number of levels for each root content and the maximum movement distance stored in the calibration DB 12, and stores the obtained threshold in the number-of-levels/level switching threshold DB 13 (step S207).

Thereafter, the content ID update unit 17 calculates anew the content ID to be selected (to be displayed) for each current root content based on the currently displayed content ID stored in the currently displayed content DB 16, the maximum distance ($d_{max}$) and the maximum movement distance stored in the calibration DB 12, and the current distance between the user and the mobile information terminal measured by the user-terminal distance measurement unit 15, and compares the calculated content ID with the currently displayed content ID stored in the currently displayed content DB 16 to check whether they match (step S208).

The necessity for updating the content ID is determined based on whether or not the calculated content ID to be displayed differs from the currently displayed content ID as a result of the comparison (step S209).

If the content ID to be displayed matches the currently displayed content ID and it is determined that the content ID need not be updated (NO in step S209), the content ID update unit 17 returns to the processing from step S208 to thereafter acquire the current distance between the user and the mobile information terminal at regular time intervals in order to perform other determinations.

While the content ID to be displayed thus matches the currently displayed content ID and it is determined that the content ID need not be updated, the processing in steps S208 and S209 is repeatedly performed to maintain the content display state on the display unit 19.

If, in step S208, the content ID to be displayed differs from the currently displayed content ID and it is determined that the content ID needs to be updated (YES in step S209), the content ID update unit 17 updates the content stored in the currently displayed content DB 16 based on the calculated content ID to be displayed (step S210).

The display content generation unit 18 determines anew the next content to be displayed based on the content ID that has been selected so far and the content stored in the content DB 20 (step S211).

When the distance between the user and the terminal is $d_n$, the depth of the hierarchical structure of the content to be displayed is $t_{max}$, and a relative trigger from n for transition between levels is "$(d_{max}-d_{min})/t_{max}$," a content $t_n$ to be displayed according to the distance $d_n$ between the user and the terminal is expressed by the following equation.

$$t_n=[(t_{max}(d_n-d_{min}))/(d_{max}-d_{min})] \quad (1)$$

For example, if $d_{min}$=50 [mm], $d_{max}$=80 [mm], and $t_{max}$=3, a control is performed to display new content with time the distance between the user and the terminal changes by 10 [mm], which serves as a trigger.

Based on the currently selected content ID and the content stored in the number-of-levels/level switching threshold DB 13, the display content generation unit 18 obtains the number of remaining levels for each content currently selected, that is, the number of contents with the same root content as the selected content at deeper levels (with higher level values) (step S212).

The display content generation unit 18 generates a comprehensive image of the content to be displayed, in accordance with the selected content, the obtained number of remaining levels, the overall number of levels and the number of levels of each content for each root content read from the number-of-levels/level switching threshold DB 13 (step S213).

Then, the generated comprehensive image of the content is superimposed on an image captured by the image capture unit arranged on the surface of the mobile information terminal that opposes the surface on which the display unit 19 is arranged, and is displayed on the display unit 19 (step S214).

Figure 5:
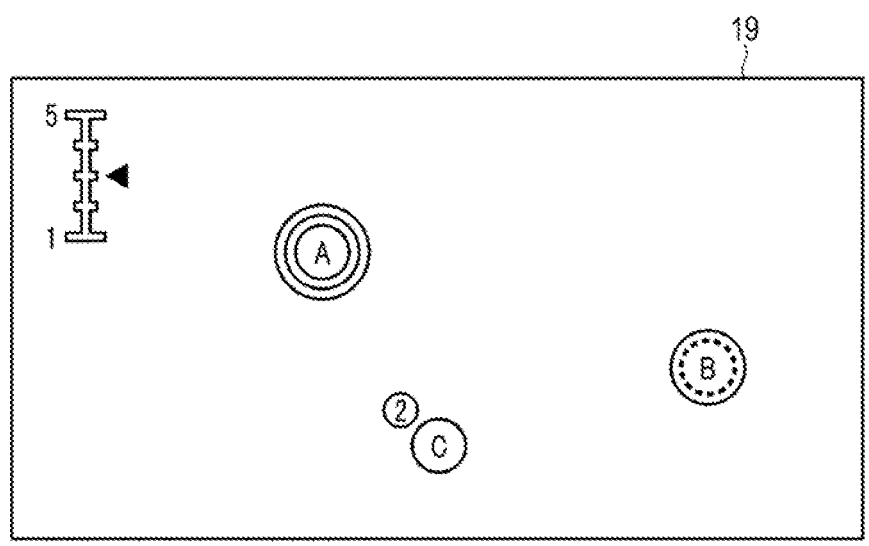
FIG. 5 shows an example of a monitor screen according to the same embodiment.

FIG. 5 shows an example of the comprehensive content that is superimposed on the captured image and displayed on the display unit 19. For the purpose of description, it is assumed here that three modes of indicating the hierarchical structure of the content are mixed. In reality, however, a unified display control is performed in one of these modes.

A bar scale displayed at an edge of the screen of the display unit 19, e.g., at the upper left edge indicates that a content with a hierarchical structure stored in the content DB 20 has up to five levels, and that a content corresponding to the middle of the hierarchical structure, namely the third level is currently being displayed.

Contents "A" to "C" in the screen of the display unit 19 correspond, in reality, to the names of buildings and shops, symbol marks indicating genres to which these subjects belong, information on coupons currently being offered, and so on.

The content "A", which is slightly on the left side of the center of the screen, is displayed with three concentric circles, indicating that the total number of levels of the currently displayed content and remaining content is three, and as a result, the number of levels of the remaining contents is two.

The content "B", which is located slightly on the right side of the center of the screen, is displayed with a double concentric circle with a circle on the center side having a different line type (which may alternatively be a different color) from the other circles, indicating that the total number of levels of the currently displayed content and remaining content is two, and as a result, the number of levels of the remaining the contents is one.

The content "C", which is slightly below the center of the screen, is displayed with a circle surrounding the content accompanied by a separate circle surrounding a number, indicating that the number of levels of the remaining contents is two.

In any cases, the number of levels of the currently displayed content and the number of remaining levels are indicated together in accordance with the content displayed, thereby enabling the user to be aware through simple expressions that the a lower-level content can be displayed if the user wants.

While performing the above-described display, the context detection unit 14 determines whether or not a different subject or position information from before has been detected in the image displayed in the display unit 19 (step S215).

If no different subject or position information from before is detected (NO in step S215) and it is determined that the display control based on the same root content as the currently selected content is to be continued, the operation returns to the processing from step S208, and the same control is repeated.

If a different subject or position information from before is detected in step S215 (YES in step S215) and it is determined that display control based on a root content different from the currently selected content needs to be started, the processing shown in FIG. 4 is terminated, and the processing in FIG. 4 is started again from the beginning.

Specifically, in the case where the facing direction of the mobile information terminal is changed upward, downward, leftward, or rightward with the user holding the mobile information terminal, if the range of the image being captured moves and subjects appearing in the image become different objects from before, the processing in FIG. 4 is executed again from the beginning.

In particular, when the user performs an operation to move the mobile information terminal away from the user in order to display a lower-level content in correspondence with a large number of contents having a tree-like hierarchical structure in which a plurality of lower-level contents exist for a higher-level content, the user may be able to select any content as appropriate when there are a plurality of lower-level contents by performing a short swing operation such as intentionally moving the mobile information terminal up, down, left, or right and then returning it, together with the operation to move away the mobile information terminal.

In this case, as for the direction of the operation to swing the mobile information terminal as mentioned above, for example, a displacement of the content of image obtained from the image capture unit capturing an image in the direction in which the user is facing may be detected through an image processing step, or a change in the orientation based on an external force applied to the mobile information terminal may be detected by the acceleration sensor.

However, such an operation to select a content may be detected only when the user performs the operation to move away the mobile information terminal he is holding, that is, when the user performs an operation to display a lower-level content. Conversely, when the user performs an operation to bring the mobile information terminal he is holding closer to him, that is, an operation to display a higher-level content, it is not necessary to detect movement in the vertical and horizontal directions because, with a tree-like hierarchical structure, a common higher-level content is to be displayed.

Thus, when a lower-level content of contents having a tree-like hierarchical structure is to be displayed, any content can be selected from a plurality of contents through an operation that is easy to understand sensuously, thereby improving usability when the user wants to quickly select a desired content from many contents.

Effects of Embodiment

According to the present embodiment described above in detail, information with a hierarchical structure can be appropriately selected and displayed in accordance with a change in the orientation in which the user viewing the display unit holds the mobile information terminal.

In the above-described embodiment, the minimum distance at which the user can view the display unit is used as a reference, the difference from the maximum distance is used as the maximum movement distance, and the level of information to be displayed is selected based on the current viewing distance within the range of the maximum movement distance. This configuration makes it possible to select an appropriate level in accordance with the actual usage by the user and display information.

In addition, in the above-described embodiment, the distance between the user and the mobile information terminal at the beginning of operation is used as the minimum distance serving as a reference, the difference from the maximum distance is calculated as the maximum movement distance, and a change in distance within the maximum movement distance is detected. This configuration allows the user to smoothly start the operation without having to be aware of the minimum distance serving as the reference.

Note that the device of the present invention may be realized as a specialized display information control device, or may alternatively be realized using a mobile information terminal such as a smartphone or a tablet terminal by means of an application program, as described in the embodiment. The application program itself can be recorded in a recording medium or provided through a network.

In addition, the present invention is not limited to the above embodiments, and may be modified in various manners without departing from the gist of the invention in the implementation stage. The embodiment includes the invention at various stages, and various inventions may be extracted by appropriately combining a plurality of disclosed constituent elements. For example, even if some constituent elements are deleted from the constituent elements described in the embodiment, if the problem described in the problem to be solved by the invention section can be solved and the effects mentioned in the effects of the invention section can be achieved, a configuration from which those constituent elements are deleted may be extracted as an invention.

REFERENCE SIGNS LIST

10 Display control unit
11 Calibration function unit
12 Calibration DB
13 Number-of-levels/level switching threshold DB
14 Context detection unit
15 User-terminal distance measurement unit
16 Currently displayed content DB
17 Content ID update unit
18 Display content generation unit
19 Display unit
20 Content DB

The invention claimed is:

1. A display information control device comprising:
a display unit;
a storage unit configured to store information to be displayed on the display unit, the information having a plurality of hierarchical levels; and
a display control unit configured to:
determine a total number of the levels based on the information;
determine thresholds for changing levels of the hierarchy based on the information;
based on (a) a maximum viewing distance between the display unit and a viewer viewing the display unit at which the viewer is able to view the display unit while holding a device housing, (b) a current viewing distance between the viewer and the device housing, and (c) the thresholds for changing levels of the hierarchy, select one of the levels of the hierarchy and read information from the storage unit of the selected level of the hierarchy,
wherein the hierarchy is a tree-like structure; and
display the read information of the selected level of the hierarchy on the display unit.

2. The display information control device according to claim 1, wherein
the display control unit uses, as a maximum movement distance, a difference between the maximum viewing distance and a minimum viewing distance between the viewer and the display unit at which the viewer is able to view the display unit, and selects the level of the hierarchy based on the current viewing distance with respect to the maximum movement distance.

3. The display information control device according to claim 2, wherein
the minimum viewing distance is acquired at the beginning of displaying information on the display unit.

4. The display information control device according to claim 1, wherein
the display control unit superimposes and displays, on the display unit, the total number of levels of the hierarchy and the number of levels of currently displayed information that are stored in the storage unit, and the number of levels of information to which each piece of displayed information is able to further transition.

5. The display information control device according to claim 1, wherein
when lower-level information in the hierarchy is selected, the display control unit accepts another operation to select one of a plurality of pieces of information that is performed with a current viewing distance kept.

6. A display information control method to be performed by a device that includes a display unit, the method comprising:
a storage step of storing information to be displayed on the display unit, the information having a plurality of hierarchical structures;
determining a total number of the levels based on the information;
determining thresholds for changing levels of the hierarchy based on the information; and
a display control step of, based on (a) a maximum viewing distance between the display unit and a viewer viewing the display unit at which the viewer is able to view the display unit while holding a device housing, (b) a current viewing distance between the viewer and the device housing, and (c) the thresholds for changing levels of the hierarchy, selecting one of the levels of the hierarchy and reading information from the storage unit of the selected level of the hierarchy
wherein the hierarchy is a tree-like structure, and displaying the read information of the selected level of the hierarchy on the display unit.

7. A non-transitory computer-readable medium having computer-executable instructions that, upon execution of the instructions by a processor of a computer, cause the computer to function as the display information control device according to claim 1.

* * * * *